(12) United States Patent
Matsumura

(10) Patent No.: US 12,460,658 B2
(45) Date of Patent: Nov. 4, 2025

(54) MANIFOLD AIR PRESSURE FEEDER AND MANIFOLD BLOCK FOR USE IN MANIFOLD AIR PRESSURE FEEDER

(71) Applicant: SMC CORPORATION, Tokyo (JP)

(72) Inventor: Kenichi Matsumura, Tsukubamirai (JP)

(73) Assignee: SMC CORPORATION, Tokyo (JP)

(*) Notice: Subject to any disclaimer, the term of this patent is extended or adjusted under 35 U.S.C. 154(b) by 112 days.

(21) Appl. No.: 18/477,617

(22) Filed: Sep. 29, 2023

(65) Prior Publication Data

US 2024/0110654 A1 Apr. 4, 2024

(30) Foreign Application Priority Data

Sep. 30, 2022 (JP) ................................. 2022-157918

(51) Int. Cl.
*F15B 13/08* (2006.01)
*F16K 27/04* (2006.01)
*F16L 41/03* (2006.01)

(52) U.S. Cl.
CPC ........ *F15B 13/086* (2013.01); *F15B 13/0817* (2013.01); *F15B 13/0821* (2013.01);
(Continued)

(58) Field of Classification Search
CPC .............. F15B 13/0817; F15B 13/0825; F15B 13/0821; F15B 13/0839; F15B 13/086;
(Continued)

(56) References Cited

U.S. PATENT DOCUMENTS

2002/0092570 A1 7/2002 Miyazoe et al.
2019/0382215 A1 12/2019 Nakayama et al.
2021/0131459 A1 5/2021 Weickel et al.

FOREIGN PATENT DOCUMENTS

DE 10 2004 044 497 B3 4/2006
DE 10 2017 214 368 A1 2/2019
(Continued)

OTHER PUBLICATIONS

Extended European Search Report issued Feb. 27, 2024 in corresponding European Application No. 23195618.6, 20 pages.

*Primary Examiner* — Atif H Chaudry
(74) *Attorney, Agent, or Firm* — Oblon, McClelland, Maier & Neustadt, L.L.P.

(57) ABSTRACT

[Object] To provide a manifold air pressure feeder and a manifold block for use in the manifold air pressure feeder that yield reductions in the piping installation work and other workloads associated with a pressure sensor configured to determine the pressure of compressed air in the manifold block and save installation space.
[Solution] An air pressure feeder 1 includes a manifold block 10 and a switching valve block 30. A first port group and a first flow path group are located in the manifold block 10. The switching valve block 30 includes a spool 33 to perform switching between communication states of a plurality of ports in a second port group. These blocks are linked directly or indirectly to each other via an ejector including a connection flow path group that forms a connection between each port in one of the port groups and the corresponding port in the other ort group. The manifold block 10 includes a pressure sensor assembly 40, which measure air pressure in a second feed flow path 16*b* and includes a sensor part 41 and a sensor substrate part 45. The manifold block includes a sensor installation cavity 23,
(Continued)

which communicates with the second feed flow path. The sensor part is inserted and fixed in the sensor installation cavity.

9 Claims, 10 Drawing Sheets

(52) U.S. Cl.
CPC ............ *F16K 27/041* (2013.01); *F16L 41/03* (2013.01); *F15B 2211/329* (2013.01)

(58) Field of Classification Search
CPC ............ F15B 2211/329; F15B 13/0402; F15B 13/0433; F16K 27/041; F16K 27/003; F16K 37/005
See application file for complete search history.

(56) References Cited

FOREIGN PATENT DOCUMENTS

| | | |
|---|---|---|
| DE | 10 2018 215 218 A1 | 3/2020 |
| EP | 3 222 855 A1 | 9/2017 |
| EP | 4 105 495 A2 | 12/2022 |
| TW | I760940 B | 4/2022 |
| WO | WO 2023/174725 A1 | 9/2023 |

MANIFOLD AIR PRESSURE FEEDER AND MANIFOLD BLOCK FOR USE IN MANIFOLD AIR PRESSURE FEEDER

TECHNICAL FIELD

The present invention relates to a manifold air pressure feeder and a manifold block for use in the manifold pressure feeder. The manifold air pressure feeder includes a sensor capable of determining the state of compressed air flowing through the manifold block.

BACKGROUND ART

For example, a manifold air pressure feeder including a manifold block equipped with a switching valve is disclosed in Patent Literature 1. Such a manifold air pressure feeder uses a pressure sensor to determine the pressure of compressed air when monitoring the state of compressed air flowing through the manifold block and performing various kinds of control on the switching valve and the like.

Determining the pressure of the compressed air necessitates the process of laying piping communicating with a flow path of the compressed air flowing through the manifold block, the process of installing the pressure sensor on the piping, and the process of routing cables extending from the pressure sensor. It is required that the installation space for the piping, routed cables, and the pressure sensors be provided on the outside of the manifold block. An air pressure feeder consisting of multiple air pressure feeding units each including a manifold block equipped with a switching valve involves the increased workload associated with the piping installation and the like and takes up more installation space.

CITATION LIST

Patent Literature

PTL 1: Japanese Unexamined Patent Application Publication No. 9-100932

SUMMARY OF INVENTION

Technical Problem

The present invention provides a manifold air pressure feeder and a manifold block for use in the manifold air pressure feeder while addressing the technical problem of how to reduce the piping installation work and other workloads associated with a pressure sensor configured to determine the pressure of compressed air flowing through the manifold block and how to save installation space.

Solution to Problem

A manifold air pressure feeder according to the present embodiment, which has been made to solve the aforementioned problem, includes a manifold block including a first port group and a first flow path group, the first port group being located in a mounting surface in an upper surface of the manifold block and composed of a plurality of ports through which air is taken in and discharged, the first flow path group being located in the manifold block and composed of a plurality of flow paths, each of the plurality of flow paths communicating with a corresponding one of the plurality of ports in the first port group; and a switching valve block including a second port group and a switching valve, the second port group being located in an installation surface in a lower surface of the switching valve block and composed of a plurality of ports through which air is taken in and discharged, the switching valve being located in the switching valve block and being for use in performing switching between communication states of the plurality of ports in the second port group, the manifold block and the switching valve block being fixedly linked to each other either by contact between the mounting surface of the manifold block and the installation surface of the switching valve block or by an intermediate block between the mounting surface and the installation surface, the contact forming a direct connection between each of the plurality of ports in the first group and a corresponding one of the plurality of ports in the second port group, the intermediate block including a connection flow path group forming a connection between each of the plurality of ports in the first group and the corresponding one of the plurality of ports in the second port group, wherein the manifold block includes a pressure sensor assembly therein to measure air pressure in a specific flow path in the first flow path group, the pressure sensor assembly includes a sensor part including a sensing element for sensing air pressure, and the manifold block has a sensor installation cavity communicating with the specific flow path, with the sensor part of the pressure sensor assembly being hermetically inserted and fixed in the sensor installation cavity.

In this case, the manifold block preferably has, on a rear side in a front-and-rear direction perpendicular to an up-and-down direction, an end surface extending perpendicularly to the mounting surface, and the sensor installation cavity is preferably provided in the end surface.

Each of the plurality of flow paths in the first flow path group preferably extends in a vertical direction perpendicular to the mounting surface from the corresponding one of the plurality of ports in the first port group, and the sensor installation cavity preferably extends perpendicularly to the plurality of flow paths extending in the vertical direction.

The pressure sensor assembly preferably includes a sensor substrate part integrally joined to an end portion of the sensor part on a rear side in a front-and-rear direction of the manifold block and electrically connected to the sensor part, and the manifold block is preferably provided with a slippage prevention member that is in contact with a back surface of the sensor substrate part to keep the sensor part from slipping out of the sensor installation cavity.

The pressure sensor assembly is preferably pivotable on a central axis of the sensor part relative to the sensor installation cavity. The sensor substrate part preferably has a quadrangular shape that has long sides and short sides. The slippage prevention member preferably includes a pair of lug portions that are in contact with end portions being part of the back surface of the sensor substrate part and being opposite to each other in a longitudinal direction of the sensor substrate part. The distance between tips of the pair of lug portions is preferably longer than each of the short sides of the sensor substrate part and is preferably shorter than each of the long sides of the sensor substrate part.

The manifold air pressure feeder preferably includes a unit group including a plurality of air pressure feeding units linked together in a line in a width direction. The plurality of air pressure feeding units are selected from the group consisting of a first air pressure feeding unit and a second air pressure feeding unit. The mounting surface of the manifold block and the installation surface of the switching valve block are in contact with each other in the first air pressure feeding unit to form a direct connection between each of the plurality of ports in the first group and the corresponding one of the plurality of ports in the second port group. The second air pressure feeding unit includes an intermediate block located between the mounting surface and the installation surface. The intermediate block includes a connection flow path group therein to form a connection between each of the plurality of ports in the first group and the corresponding one of the plurality of ports in the second port group. The unit group is provided with a controller linked to an end in the width direction of the unit group. The controller is configured to transmit an electrical signal to the unit group and to receive an electrical signal from the unit group. The plurality of air pressure feeding units constituting the unit group each include a connection substrate part for transmission of an electrical signal and include at least one manifold block including the pressure sensor assembly and electric wiring forming an electrical connection between the pressure sensor assembly and the connection substrate part. The first port group includes an intake air port for feeding air into the switching valve block and a discharge port for letting out air discharged from the switching valve block. The first flow path group includes an intake air flow path for feeding air into the switching valve block and a discharge air flow path for discharging air discharged from the switching valve block. The intake air flow path includes both an intake air main flow path provided to a pair of opening portions in side surfaces opposite to each other in a width direction of the manifold block to enable communication between the opening portions and an intake air branch flow path branching from the intake air main flow path and having an end connected to the intake air port. The discharge air flow path includes a discharge air main flow path provided to a pair of opening portions in the side surfaces opposite to each other in the width direction of the manifold block to enable communication between the opening portions and a discharge air branch flow path branching from the discharge air main flow path and having an end connected to the discharge port. In the unit group, the intake air flow path and the discharge air flow path in each of the plurality of air pressure feeding units communicate with each other, and the controller and the connection substrate parts of the plurality of air pressure feeding units are electrically connected to each other. The manifold air pressure feeder is thus capable of transmitting electrical signals between the controller and the pressure sensor assembly.

The manifold block preferably has, on a rear side thereof, an end surface extending perpendicularly to the mounting surface. The manifold block preferably includes a substrate accommodation portion protruding from a lower end surface being part of the end surface and located below the sensor installation cavity. The connection substrate part is preferably disposed in the substrate accommodation portion. The pressure sensor assembly preferably includes a sensor substrate part integrally joined to an end portion of the sensor part on a rear side in a front-and-rear direction of the manifold block and electrically connected to the sensor part. The electric wiring preferably extends over and along the substrate accommodation portion and preferably has ends that are connected to the sensor substrate part and the connection substrate part, respectively.

The substrate accommodation portion is preferably fitted with a manifold cover that is disposed over the substrate accommodation portion to cover the sensor substrate part and the electric wiring.

The manifold block is preferably for use in the manifold air pressure feeder.

Advantageous Effects of Invention

The manifold air pressure feeder and the manifold block for use in the manifold air pressure feeder according to the present invention described above can yield reductions in the piping installation work and other workloads associated with the pressure sensor configured to determine the pressure of compressed air flowing through the manifold block and can save installation space.

DESCRIPTION OF EMBODIMENTS

The present invention, which relates to a manifold air pressure feeder and a manifold for use in the manifold air pressure feeder, is described below. According to an embodiment, the manifold block is part of the manifold air pressure feeder and is described below in relation to the manifold air pressure feeder.

Figure 1:
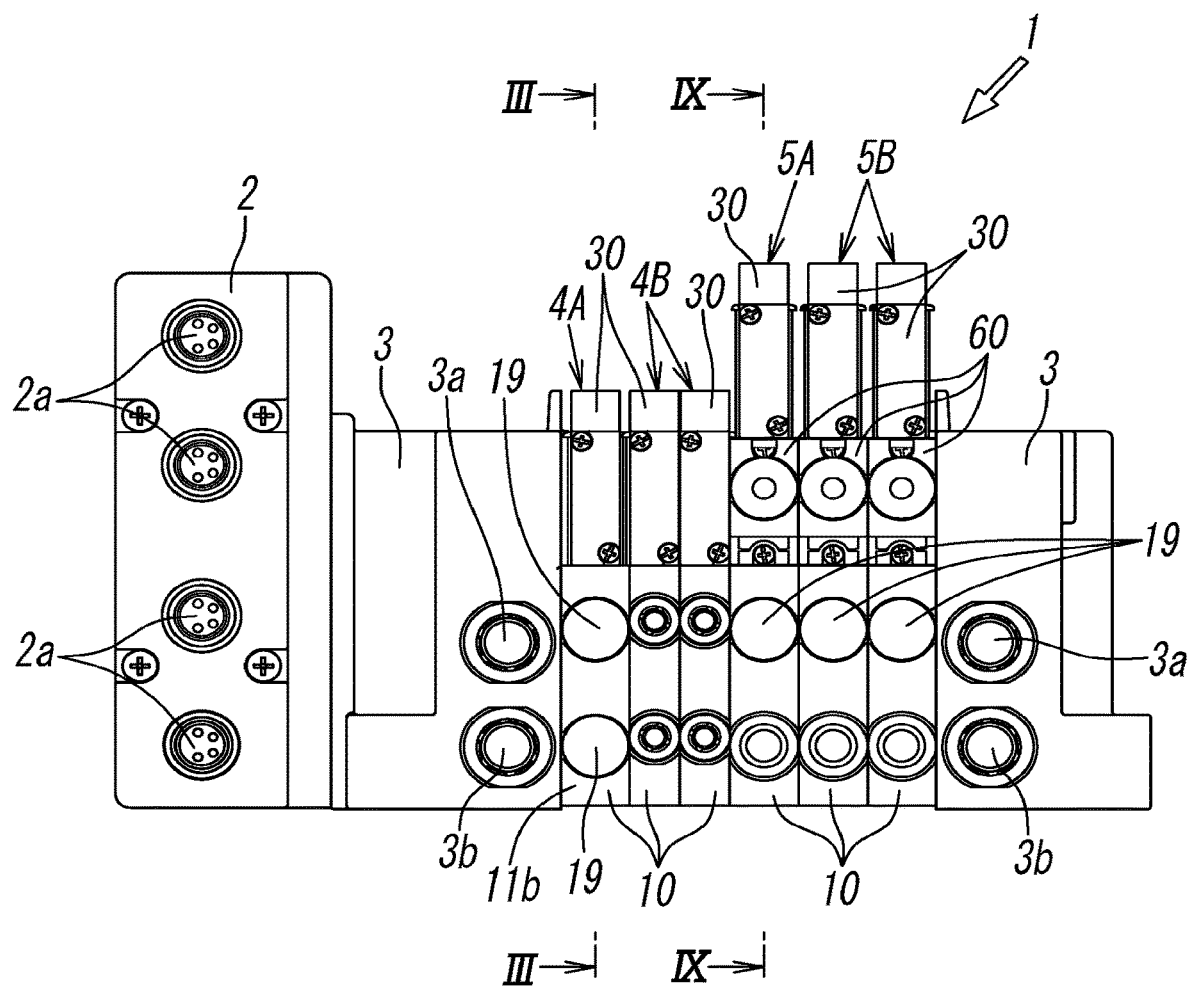
FIG. 1 is a font view of a manifold air pressure feeder according to an embodiment of the present invention.
Figure 2:
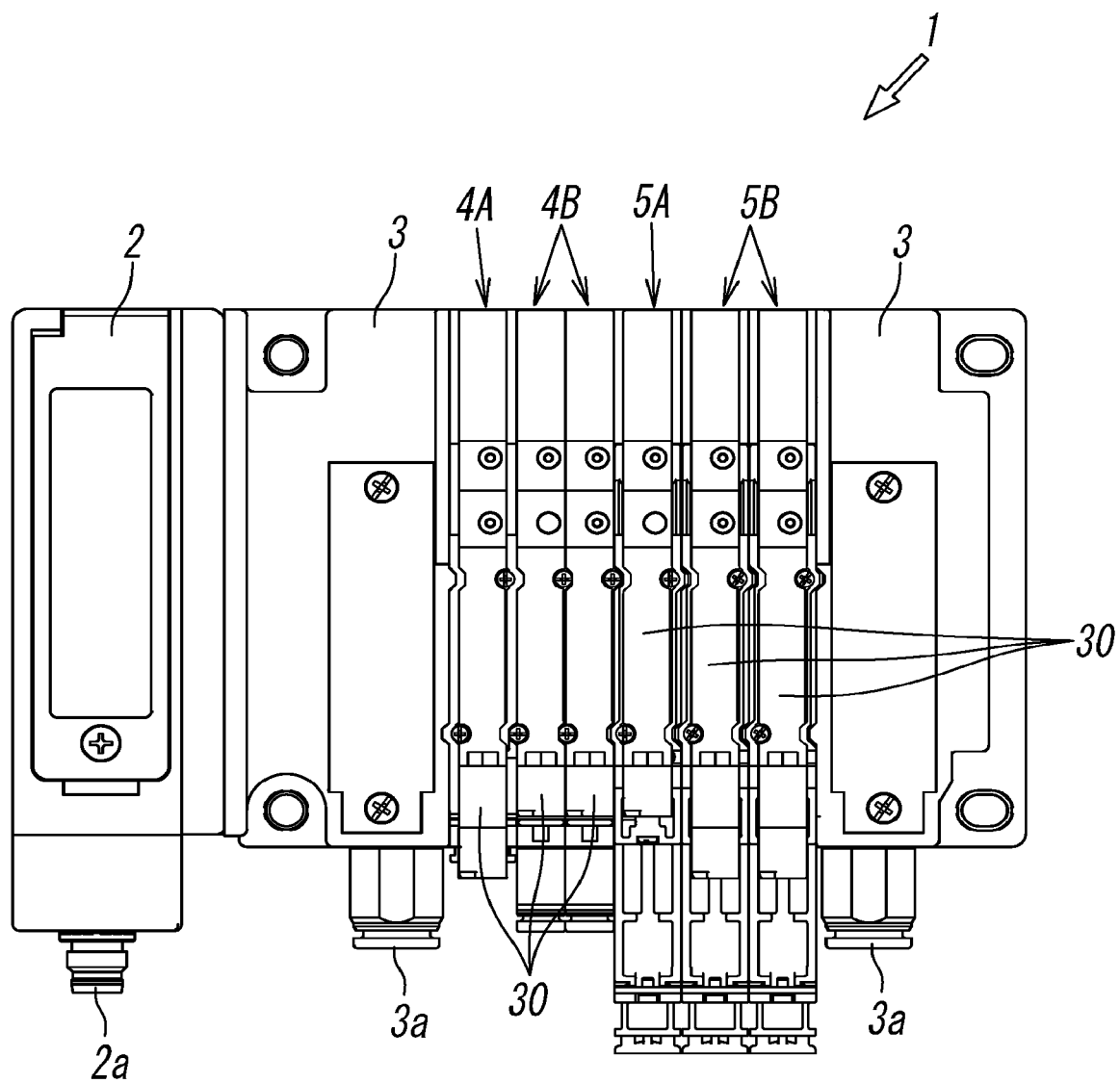
FIG. 2 is a plan view of the manifold air pressure feeder.

FIGS. 1 and 2 illustrate a manifold air pressure feeder 1. The manifold air pressure feeder 1 includes an end block 2 (controller), port blocks 3, first air pressure feeding units 4A and 4B, and second air pressure feeding units 5A and 5B, which are arranged in a width direction perpendicular to an up-and-down direction and integrally joined together. In the present embodiment, the end block 2, one of the port blocks 3, three first air pressure feeding units respectively denoted by 4A, 4B, and 4B, three second air pressure feeding units respectively denoted by 5A, 5B, and 5B, and the other port bock 3 are arranged in sequence from one side to the other side of the width direction and are integrally joined together to constitute the manifold air pressure feeder 1.

The units of the manifold air pressure feeder 1 are arranged side by side with, for example, their side surfaces opposite to each other in the width direction and are detachably linked together with, for example, a tie rod (not illustrated). The first air pressure feeding units 4A and 4B each include a manifold block 10 and a switching valve block 30. The switching valve block 30 is mounted on the manifold block 10 (see FIG. 3). The second air pressure feeding units 5A and 5B each include a manifold block 10, a switching valve block 30, and an ejector block 60. The ejector block 60 is mounted on the manifold block 10, and the switching valve block 30 is mounted on the ejector block (see FIG. 9). The port blocks 3 each include a feed port 3a and a discharge port 3b, which are front-located ports. The end block 2 includes connectors 2a, which are front-located connectors for supplying power and electrical signals to pilot valve portions 36 of the switching valve blocks 30, 30' of the first and second air pressure feeding units 4A, 4B, 5A, and 5B and to a pressure sensor assembly 40, which will be described later.

The leftmost one of the three first air pressure feeding units respectively denoted by 4A, 4B, and 4B is the first air pressure feeding unit 4A (and is hereinafter referred to as a "pilot air control unit 4A"). The pilot air control unit 4A in the present embodiment is configured to feed compressed air to a switching valve block 30' of the second air pressure feeding unit 5A (see FIG. 9). The compressed air fed to the switching valve block 30' is used as pilot pressure. With the three first air pressure feeding units being respectively denoted by 4A, 4B, and 4B and arranged side by side in the width direction, one of the first air pressure feeding unit 4B is located in the middle, and the other first air pressure feeding unit 4B is located on the right side. The manifold blocks 10 of the two first air pressure feeding units 4B receive a supply of air from the respective switching valve blocks 30 and then feed the air to the outside through flow paths formed in the respective manifold blocks 10. The manifold blocks 10 of the three first air pressure feeding units respectively denoted by 4A, 4B, and 4B are structurally similar to one another. Thus, only the manifold block 10 of the pilot air control unit 4A is described below.

Figure 3:
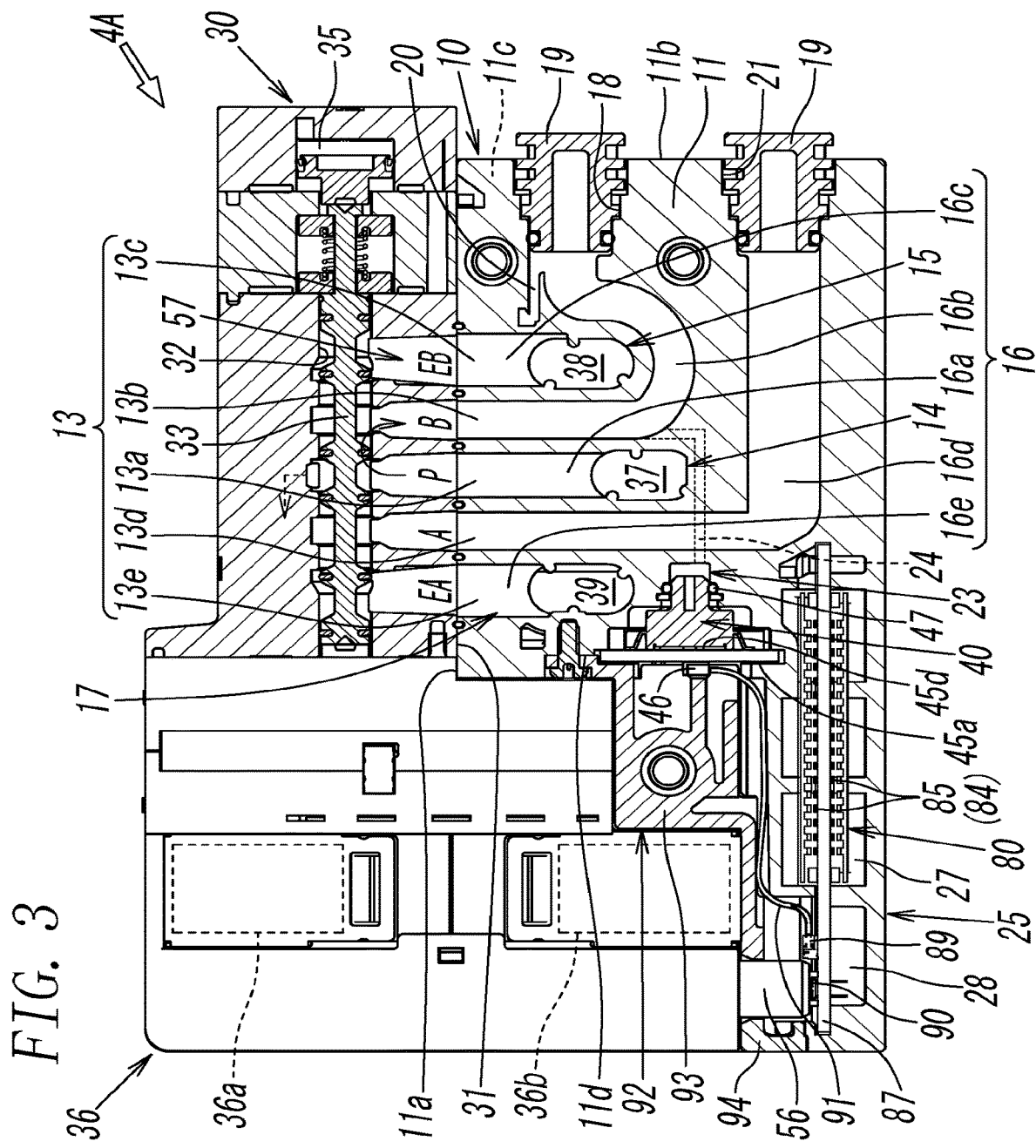
FIG. 3 illustrates a first air pressure feeding unit viewed in section in the direction of arrows III-III in FIG. 1 and including a manifold block and a switching valve block.

The following describes the switching valve block 30 mounted on the manifold block of the pilot air control unit 4A. As illustrated in FIG. 3, the switching valve block 30 is a three-port electromagnetic valve that enables switching between communication states of a switching-valve-side intake air inlet port P, a second output port B, and a second discharge port EB. These ports have openings defined in an installation surface 31 in a lower surface of the switching valve block 30. A first output port A and a first discharge port EA are not used in the present embodiment. The ports respectively denoted by P, B, and EB are hereinafter collectively referred to as a second port group 57.

The switching valve block 30 is an internal pilot operated electromagnetic valve and includes a valve bore 32, a spool 33, a first pressure chamber 34 (see FIG. 9), and a second pressure chamber 35. The valve bore 32 extends in an axial direction (hereinafter referred to as the front-and-rear direction) perpendicular to the up-and-down direction, and the spool 33 is movably inserted in the valve bore 32. The first pressure chamber 34 (see FIG. 9) and the second pressure chamber 35 are formed on opposite sides in the front-and-rear direction with the valve bore 32 therebetween. Air fed into the port P is partly fed into the first pressure chamber 34 and the second pressure chamber 35. The pilot pressure causes a reciprocating motion of the spool 33 in the valve bore 32 of the switching valve block 30, which performs switching between communication states of the ports P, B, and EB accordingly.

The pilot valve portion 36 is provided in the rear of the switching valve block 30 to control the feeding of pilot pressure to the first pressure chamber 34 and the second pressure chamber 35. The pilot valve portion 36 in the present embodiment includes a first pilot valve 36a and a second pilot valve 36b for use in controlling the feeding of pilot pressure to the first pressure chamber 34 and the second pressure chamber 35, respectively.

Figure 4:
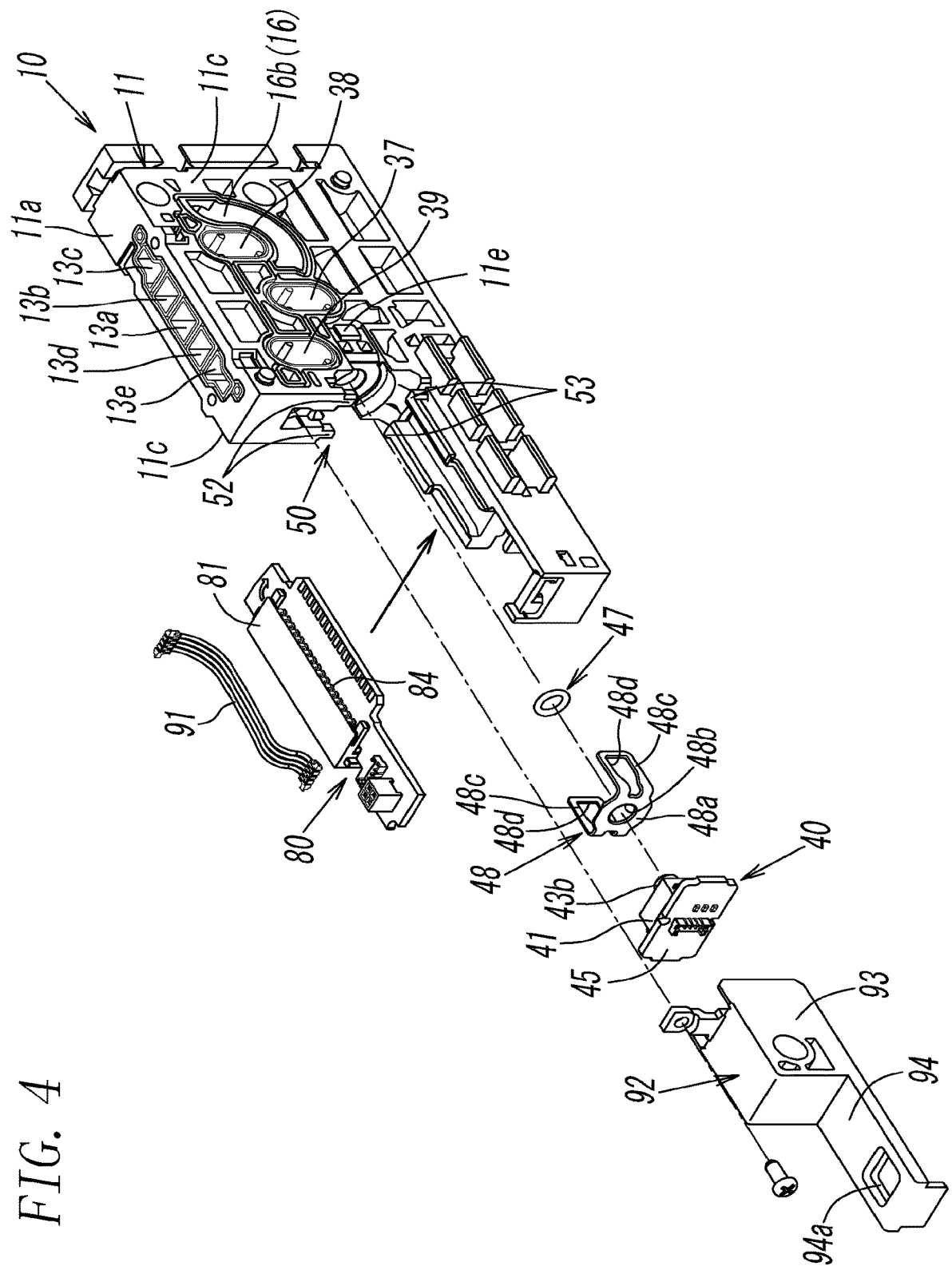
FIG. 4 is an exploded perspective view of a structure for installation of a pressure sensor assembly in the manifold block.

The following describes the manifold block 10 of the pilot air control unit 4A. As illustrated in FIGS. 1, 3, and 4, the manifold block 10 includes a base body 11, which is the body of the manifold block 10. The base body 11 of the manifold block in the present embodiment is a rectangular parallelepiped extending in the front-and-rear direction, where the thickness of the base body 11 in the width direction is less than the length of the base body 11 in the front-and-rear direction. The base body 11 has, in its upper surface, a mounting surface 11a. A first port group 13, which is made up of multiple ports, is formed in the mounting surface 11a. Air is taken in and discharged through the ports.

The base body 11 includes a first flow path group 16, which is made up of multiple flow paths. Each of the flow paths formed in the base body 11 communicates with the corresponding one of the ports in the first port group 13. The first port group 13 in the present embodiment includes an intake air port 13a, a second output port 13b, and a second discharge port 13c. The intake air port 13a is formed in the midsection of the base body 11 in the front-and-rear direction. The second output port 13b is closer than the intake air port 13a to the front, and the second discharge port 13c is closer than the second output port to the front. A first output port 13d and a first discharge port 13e, which are closer than the intake air port 13a to the rear, are not used in the present embodiment.

The first flow path group 16 includes an intake air flow path 14, a second feed flow path 16b, and a discharge air flow path 15. The intake air flow path 14 includes an intake air main flow path 37 and an intake air branch flow path 16a. Compressed air is fed into the intake air main flow path 37. The intake air branch flow path 16a branches from the intake air main flow path 37 and communicates with the intake air port 13a. The second feed flow path 16b communicates with the second output port 13b. The discharge air flow path 15 includes a second discharge air main flow path 38 (discharge air main flow path) and a second discharge air branch flow path 16c. Compressed air is discharged through the second discharge air main flow path 38. The second discharge air branch flow path 16c branches from the second discharge air main flow path 38 and communicates with the second discharge port 13c. The intake air main flow path 37 is connected to a pair of opening portions (not illustrated) in side surfaces opposite to each other in the width direction of the base body 11 and extends between the opening portions. As with the intake air main flow path 37, the second discharge air main flow path 38 is connected to a pair of opening portions in the side surfaces of the base body 11 opposite to each other in the width direction and extends between the opening portions.

The first flow path group 16 further includes a discharge air flow path 17 and a first feed flow path 16d. The discharge air flow path 17 includes a first discharge air main flow path 39 and a first discharge air branch flow path 16e. Compress air is discharged through the first discharge air flow main path 39. The first discharge air branch flow path 16e branches from the first discharge air main flow path 39 and communicates with the first discharge port 13e. The first feed flow path 16d communicates with the first output port 13d. The first discharge air main flow path 39 is connected to a pair of opening portions (not illustrated) in the side surfaces opposite to each other in the width direction of the base body 11 to enable communication between the opening portions.

The second feed flow path 16b communicates with an opening portion 18, which is in an end surface on the front of the base body 11. The opening portion 18 in the present embodiment is closed with a cap 19, which is fitted in the opening portion 18. The second feed flow path 16b communicates with a pilot flow path 20 at an end close to the opening portion 18. The pilot flow path 20 extends from the second feed flow path 16b toward the second discharge air branch flow path 16c and bends to an opening portion (not illustrated) in one of side surfaces 11c of the base body 11. The side surfaces 11c are opposite to each other in the width direction.

The flow paths 16a to 16e extend perpendicularly to the mounting surface 11a. The intake air branch flow path 16a is orthogonal to the intake air main flow path 37 and communicates with it. The second discharge air branch flow path 16c is orthogonal to the second discharge air main flow path 38 and communicates with it. The first feed flow path 16d communicating with the first output port 13d and the first discharge air branch flow path 16e communicating with the first discharge port 13e are not used in the present embodiment. Thus, the first feed flow path 16d is closed with a cap 19, which is fitted in an opening portion 21 in an end surface 11b on the front of the base body 11. The first feed flow path 16d communicates with the opening portion 21.

The intake air main flow path 37, the second discharge air main flow path 38, and the first discharge air main flow path 39 are as follows. With the first air pressure feeding units 4A and 4B being linked to each other in the width direction, their respective intake air main flow paths 37 communicate with each other. Likewise, their respective second discharge air main flow paths 38 communicates with each other, and their respective first discharge air main flow paths 39 communicate with each other. The intake air main flow path 37 communicates with the feed port 3a of the port block 3. The first discharge air main flow path 39 and the second discharge air main flow path 38 communicate with the discharge port 3b of the port block 3.

As mentioned above, the pilot air control unit 4A in the present embodiment includes the pilot flow path 20 communicating with the second feed flow path 16b. Switching between communication states takes place due to the switching movement of the spool 33 of the switching valve block 30. Upon switching to the state in which the port P and the port B communicate with each other, compressed air is fed into the pilot flow path 20 through the second feed flow path 16b. In the present embodiment, the compressed air is then fed into the switching valve block 30 of the second air pressure feeding unit 5A as the pilot pressure. The switching valve block 30 of the second air pressure feeding unit 5A is an external pilot operated valve.

Figure 5:
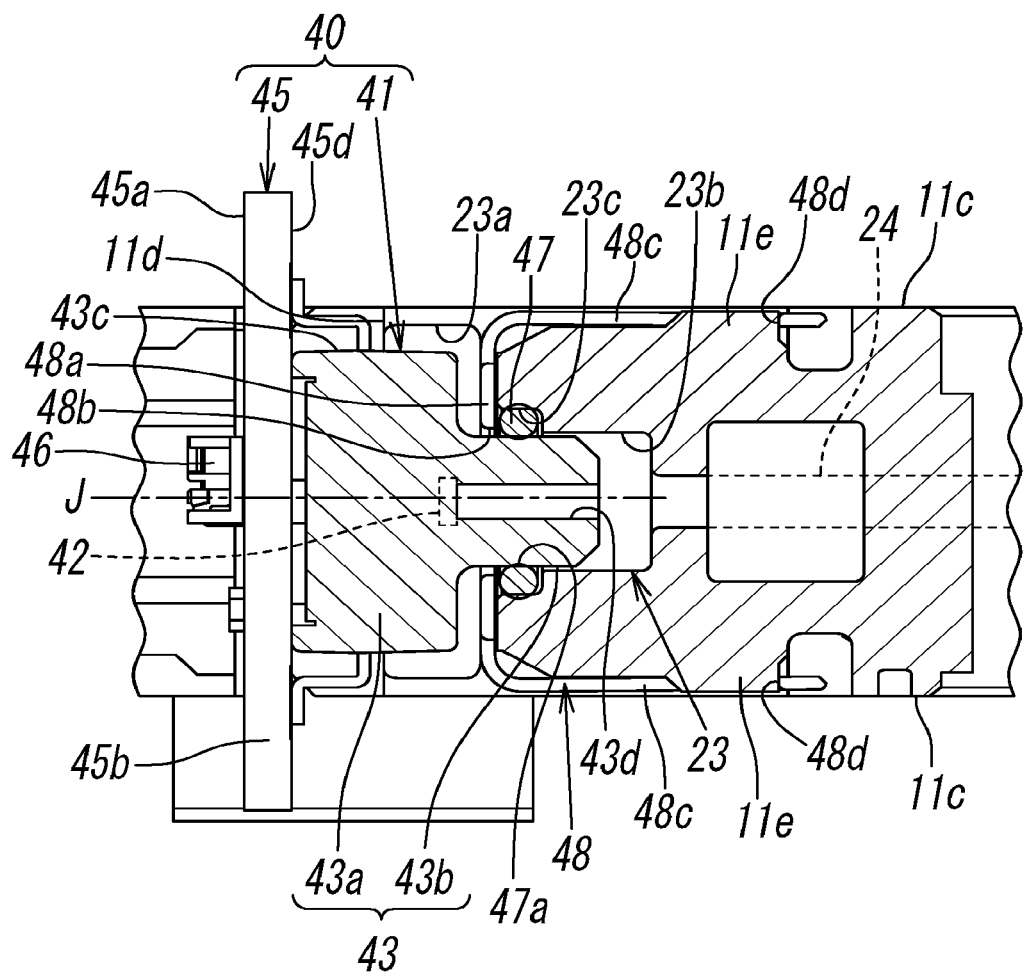
FIG. 5 is a sectional view for explanation of a structure for installation of the pressure sensor assembly.

As illustrated in FIGS. 3 and 5, the pressure sensor assembly 40 is disposed in the manifold block 10 of the pilot air control unit 4A to measure the air pressure in the pilot flow path 20. The pressure sensor assembly 40 includes a sensor part 41. The sensor part 41 includes an air pressure sensing module 42 (sensing element) for sensing air pressure. The pressure sensor assembly 40 in the present embodiment includes a sensor substrate part 45, which is integrally joined to a rear end portion of the sensor part 41 and electrically connected to the sensor part 41. The sensor part 41 is provided to a front surface 45d of the sensor substrate part 45. The front surface 45d is oriented toward the front of the manifold block 10. The sensor part 41 in the present embodiment includes, as well as the air pressure sensing module 42, a sensor cover portion 43. The air pressure sensing module 42 is accommodated in the sensor cover portion 43. The air pressure sensing module 42 is configured to generate a digital signal by subjecting air pressure to A/D conversion and to output the digital signal.

The air pressure sensing module 42 converts gauge resistance to an electrical signal. The gauge resistance changes due to deformations caused by pressure. For example, the air pressure sensing module 42 may be a semiconductor pressure sensing module including a silicon chip or may be a strain gauge pressure sensor module including a strain gauge.

The sensor cover portion 43 includes a cover main body section 43a and a protrusion 43b, which protrudes at a front end of the cover main body section 43a. The cover main body section 43a in the present embodiment is in the form of a hollow box having an open rear end and extending in the up-and-down direction. The cover main body section 43a has outer surfaces 43c, which are located on both sides in the longitudinal direction and protrude outward. The outer surfaces 43c are arc-shaped. The outer surfaces 43c are movable in a circumferential direction along an inner surface defining a sensor installation cavity 23, in which the sensor cover portion 43 is accommodated. The sensor installation cavity 23 will be described later. The cover main body section 43a is fitted on the front surface 45d of the sensor substrate part 45 without extending off the edges of the front surface 45d.

The protrusion 43b is smaller than the cover main body section 43a and protrudes from the midsection of the front surface of the cover main body section 43a. The protrusion 43b has a slot 43d, which extends rearward from the front end of the protrusion 43b. The air pressure sensing module 42 is fitted in the bottom of the slot 43d.

Figure 8:
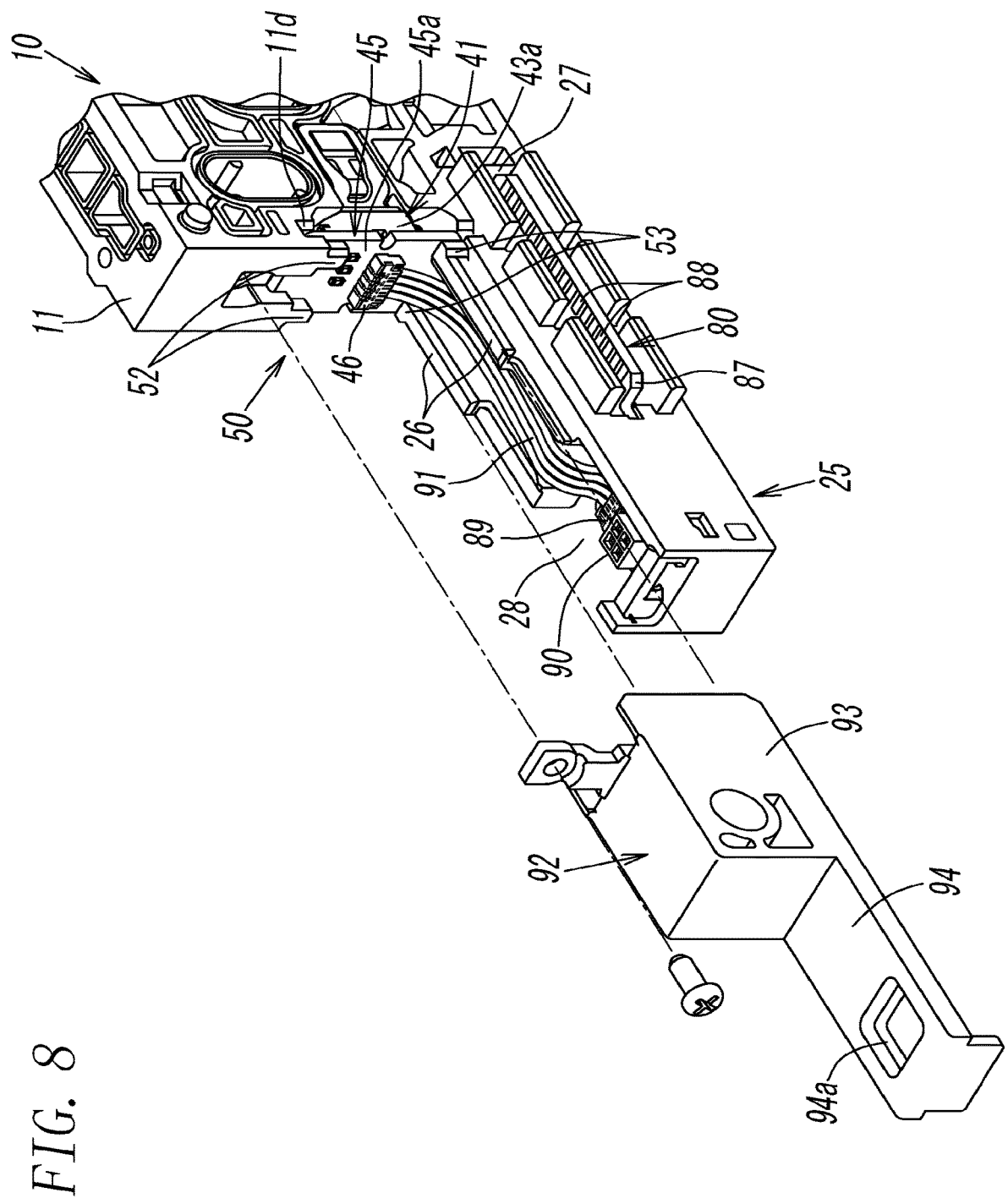
FIG. 8 is a perspective view of part of the manifold block, illustrating how the manifold block is to be fitted with a manifold cover.

As illustrated in FIGS. 5 and 8, the sensor substrate part 45 is a plate-like member having a rectangular shape (quadrangular shape) that has long sides and short sides, and the sensor substrate part 45 is electrically connected to the air pressure sensing module 42. The sensor substrate part 45 is fitted with a first connector 46, which is located in the midsection of a back surface 45a of the sensor substrate part 45 and electrically connected to the sensor substrate part 45. The first connector 46 is a relay point for the supply of power to the pressure sensor assembly 40 and for transmission of sensing signals.

As illustrated in FIGS. 3 and 5, the sensor part 41 of the pressure sensor assembly 40 described above communicates with the second feed flow path 16b and is hermetically inserted and fixed in the sensor installation cavity 23 in an end surface 11d on the rear of the base body 11 of the manifold block 10. The sensor installation cavity 23 in the present embodiment extends forward from an opening in the end surface 11d of the base body 11 toward the first feed flow path 16d extending vertically and communicates with the second feed flow path 16b with a sensing flow path 24 therebetween.

The sensor installation cavity 23 includes a vertically long cavity 23a and an engagement cavity 23b. The vertically long cavity 23a extends in the up-and-down direction. The engagement cavity 23b is provided in the bottom of the vertically long cavity 23a. The vertically long cavity 23a is located below the first discharge air main flow path 39 in the base body 11 and extends between openings provided on both sides in the width direction. Inner surfaces located on both sides in the up-and-down direction of the vertically long cavity 23a are curved and arc-shaped. The cover main body section 43*a* of the sensor part 41 is fitted in the space defined by the inner surfaces.

The engagement cavity 23*b* has a cylindrical shape protruding from its bottom at the front end to the midsection of the bottom of the vertically long cavity 23*a*. The sensing flow path 24 communicates with the bottom of the engagement cavity 23*b*. One end portion of the sensing flow path 24 is located on the bottom of the engagement cavity 23*b*. The sensing flow path 24 extends in the form of a straight line in a direction perpendicular to the second feed flow path 16*b* extending in the up-and-down direction. The sensing flow path 24 bends upward at a point below the second feed flow path 16*b* and communicates with the second feed flow path 16*b*.

If there is a gap between the engagement cavity 23*b* and the sensor cover portion 43 inserted in the engagement cavity 23*b*, air would leak out between the sensor cover portion 43 and the engagement cavity 23*b* while air pressure is exerted via the sensing flow path 24. This can cause a decrease in air pressure such that the pressure air will not be able to be measured accurately. As a workaround, an O ring 47 is fitted in the engagement cavity 23*b*. As illustrated in FIG. 5, the engagement cavity 23*b* in the present embodiment has, in its rear part, an annular groove 23*c*, in which the O ring 47 is fitted. The annular groove 23*c* has an open rear end. The inner diameter of the annular groove 23*c* is slightly smaller than the outer diameter of the O ring 47. The dimension of the annular groove 23*c* in the front-and-rear direction is slightly greater than the thickness of the O ring 47. A hole 47*a* extends through the middle of the O ring 47. The inner diameter of the hole 47*a* is slightly smaller than the outer diameter of the protrusion 43*b*.

With the O ring 47 being fitted in the annular groove 23*c*, the protrusion 43*b* of the sensor cover portion 43 is inserted into the hole 47*a* extending through the O ring 47, causing elastic deformation of the O ring 47. As a result, the inner surface of the annular groove 23*c* and the outer surface of the O ring 47 come into close contact with each other, and the inner surface defining the hole 47*a* of the O ring 47 and the outer surface of the protrusion 43*b* come into close contact with each other. In this way, the sensor part 41 is hermetically inserted into the sensor installation cavity 23.

The force generated by the air pressure is exerted on the O ring 47 in the annular groove 23*c* toward the rear of the annular groove 23*c*. Consequently, the O ring 47 can slip out of the annular groove 23*c*. As illustrated in FIGS. 4 and 5, the manifold block 10 is fitted with a stopper 48, which keeps the O ring 47 from slipping out. The stopper 48 includes a contact member 48*a* and a pair of leg portions 48*c*. The contact member 48*a* has a cavity 48*b*, into which the protrusion 43*b* is inserted. With the cavity 48*b* surrounding the periphery of the protrusion 43*b*, the contact member 48*a* is in contact with the rear end portion of the O ring 47. The leg portions 48*c* protrude from ends opposite to each other in the width direction of the contact member 48*a*. The leg portions 48*c* extend forward along the side surfaces opposite to each other in the width direction of the base body 11 of the manifold block 10. The stopper 48 in the present embodiment is made of metal (e.g., SUS) and is elastically deformable.

The contact member 48*a* has a rectangular shape extending in the width direction. The cavity 48*b* is formed in the midsection of the contact member 48*a* and is larger in diameter than the protrusion 43*b*. Each leg portion of the pair of leg portions 48*c* includes an engagement cavity 48*d*. The engagement cavities 48*d* extending within the leg portions 48*c* are rectangular and are U-shaped. The side surfaces 11*c* on both sides in the width direction of the base body 11 have lock protrusions 11*e*, which are caught in the respective engagement cavity 48*d*. Accordingly, the stopper 48 is fixed to the base body 11. With the stopper 48 being fixed to the base body 11, the inner surface of the contact member 48*a* is close to or in contact with the rear end of the O ring 47. The stopper 48 can keep the O ring 47 from slipping out of the annular groove 23*c*. In a state in which the protrusion 43*b* of the sensor cover portion 43 is inserted in the O ring 47, the pressure sensor assembly 40 is pivotably supported in the sensor installation cavity 23. The pressure sensor assembly 40 in the sensor installation cavity 23 is pivotable on a central axis J of the protrusion 43*b*.

Figure 6:
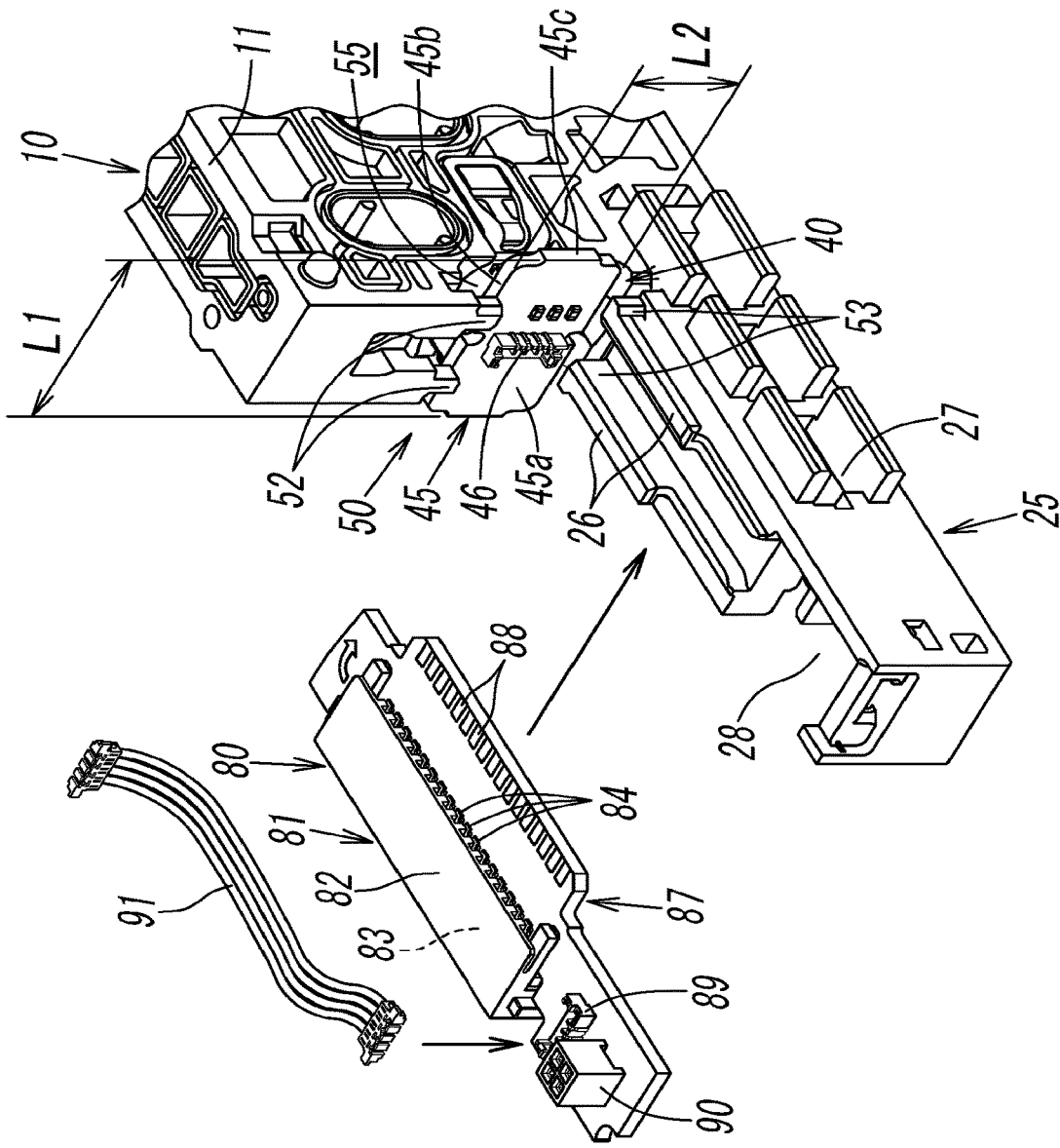
FIG. 6 is a perspective view of part of the manifold block, illustrating how the pressure sensor assembly, a connection substrate part, and electric wiring are to be installed in the manifold block.
Figure 7:
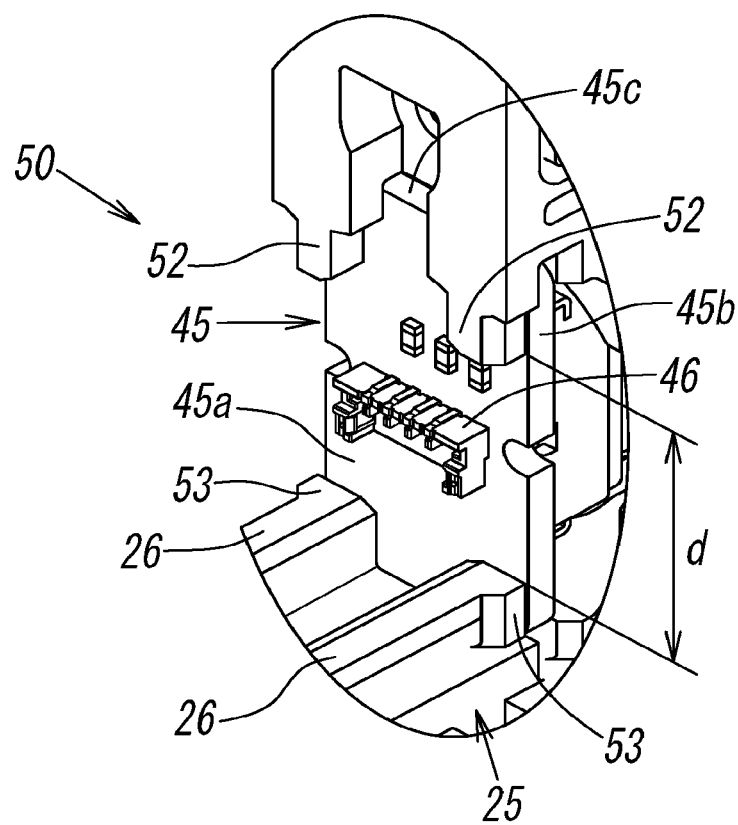
FIG. 7 is an enlarged view of part of the manifold block, illustrating how the pressure sensor assembly is to be fixed to the manifold block.

With the protrusion 43*b* of the sensor cover portion 43 inserted in the O ring 47, the pressure sensor assembly 40 can slip out of the sensor installation cavity 23 when being entirely pushed rearward by the air pressure. As a workaround, a slippage prevention member 50, which is illustrated in FIGS. 6, 7, and 8, is provided to a rear end portion of the manifold block 10 and is in contact with the back surface 45*a* of the sensor substrate part 45. The slippage prevention member 50 in the present embodiment includes upper lug portions 52 (lug portions) and lower lug portions 53 (lug portions). Each upper lug portion 52 and each lower lug portion 53 are in contact with an upper end portion and a lower end portion, respectively, of the back surface 45*a* of the sensor substrate part 45.

Two pairs of lug portions are provided at the rear of the sensor substrate part 45. The pair of upper lug portions 52 is provided in an upper part of the base body 11, with each upper lug portion 52 located on a corresponding side in the with direction. The pair of lower lug portions 53 is located below the pair of upper lug portions 52. The front of each upper lug portion of the pair of upper lug portions 52 is planar and oriented toward the sensor substrate part 45. Each lower lug portion of the pair of lower lug portions 53 is provided on a front end on a corresponding side in the width direction of a substrate accommodation portion 25, which protrudes from a lower part of the end surface 11*d* on the rear of the base body 11 and will be described later. The front of each of the lower lug portions 53 is planar and oriented toward the sensor substrate part 45.

Front end surfaces of the upper and lower lug portions 52 and 53 lie in the same plane. The upper and lower lug portions 52 and 53 are arranged with a distance d (see FIG. 7) between tips of the lug portions 52 and tips of the lug portions 53. The distance d between the tips of the lug portions 52 and the tips of the lug portions 53 is greater than L2 denoting the length of short sides 45*c* of the sensor substrate part 45 and is less than L1 denoting the length of long sides 45*b* of the sensor substrate part 45. The sensor cover portion 43 of the sensor part 41 is located within the edges of the sensor substrate part 45. Thus, the pressure sensor assembly 40 can pass between the tips of the lug portions 52 and the tips of the lug portions 53 in a state in which the long sides 45*b* of the sensor substrate part 45 extend in the width direction perpendicular to the front-and-rear direction.

A space 55 (see FIG. 6) is left between the upper and lower lug portions 52 and 53 and the end surface 11*d* on the rear of the base body 11. The space 55 includes a region where the sensor substrate part 45 can pivot on the central axis J of the protrusion 43*b* of the sensor substrate part 45 in the state in which the sensor part 41 is inserted in the sensor installation cavity 23.

When the sensor substrate part 45 pivots to make a transition from the state in which the long sides 45*b* extend in the lateral direction to a state in which the long sides 45*b* extend in the up-and-down direction, each of the upper and lower end portions in the longitudinal direction of the back surface 45*a* of the sensor substrate part 45 come into contact with the corresponding one of the upper and lower lug portions 52 and 53. In this way, the pressure sensor assembly 40 is kept from slipping out of the sensor installation cavity 23. When the sensor substrate part 45 is in contact with the upper and lower lug portions 52 and 53, the first connector 46 on the sensor substrate part 45 is located between the tips of the upper lug portions 52 and the tips of the lower lug portions 53 and is exposed to view. This provides ease in connecting electric wiring 91, which is to be connected to the first connector 46.

The following describes the insertion of the pressure sensor assembly 40 into the sensor installation cavity 23 and the withdrawal of the pressure sensor assembly 40 from the sensor installation cavity 23. Referring to FIG. 6 illustrating how the pressure sensor assembly 40 is to be inserted into the sensor installation cavity 23, the sensor part 41 of the pressure sensor assembly 40 is oriented toward the clearance between the tips of the upper lug portions 52 and the tips of the lower lug portions 53, and the long sides 45*b* of the sensor substrate part 45 extend in the lateral direction. In this state, the pressure sensor assembly 40 is moved forward toward the clearance between the lug portions 52 and the lug portions 53. Then, as illustrated in FIG. 5, the sensor part 41 is inserted into the sensor installation cavity 23, and the protrusion 43*b* is inserted into the engagement cavity 23*b*. The entirety of the pressure sensor assembly 40 is then moved to pivot on the central axis J of the protrusion 43*b* with the sensor substrate part 45 and thus makes a transition into the state illustrated in FIG. 7, in which the long sides 45*b* of the sensor substrate part 45 extend in the up-and-down direction. Consequently, the end portions on both sides in the longitudinal direction of the back surface 45*a* of the sensor substrate part 45 come into contact with the upper lug portions 52 and the lower lug portions 53, with each end portion in contact with the corresponding one of the lug portions 52 and 53. The sensor part 41 of the pressure sensor assembly 40 is hermetically inserted into the sensor installation cavity 23. The pressure sensor assembly 40 is thus fixed and kept from slipping out of the sensor installation cavity 23.

As illustrated in FIGS. 3, 6, and 8, the substrate accommodation portion 25 is located on a lower part of the end surface 11*d* (lower end surface) on the rear of the base body 11 and protrude rearward. The substrate accommodation portion 25 in the present embodiment is a rectangular parallelepiped and includes a pair of guide rails 26 and a substrate accommodation cavity 27. The guide rails 26 are located on both sides in the width direction of an upper front part of the substrate accommodation portion 25 and extends in the front-and-rear direction. The substrate accommodation cavity 27 is located in the midsection in the up-and-down direction of a front part of the substrate accommodation portion 25. The substrate accommodation cavity 27 extends through the substrate accommodation portion 25 in the width direction and also extends in the front-and-rear direction. A connector accommodation recess 28 is provided at the rear of the substrate accommodation cavity 27. An upper part of the connector accommodation recess 28 is open. The connector accommodation recess 28 communicates with the substrate accommodation cavity 27 in the front-and-rear direction. A connection substrate part 80 is fitted in the substrate accommodation cavity 27 and the connector accommodation recess 28 to transmit electrical signals. The connection substrate part 80 in the present embodiment transmits switching control signals to the switching valve block 30, supplies driving power to the switching valve block 30, or transmits sensing signals (digital sensing signals) from the pressure sensor assembly 40.

The connection substrate part 80 is electrically connected to the connection substrate part 80 that is adjacent thereto in the width direction and that is provided to the manifold block 10 of another first air pressure feeding unit denoted by 4B (see FIG. 1). The connection substrate part 80 in the present embodiment includes a connector main body 81 and a plug substrate 87. The connector main body 81 serves as a socket. The plug substrate 87 serves as a plug and is detachably connected to the connector main body 81. The connector main body 81 includes a body 82, which is narrow and extends in the front-and-rear direction. A substrate insertion cavity 83 extends through the body 82 in the width direction. Socket terminals 84 are arranged in the substrate insertion cavity 83 and are spaced apart from each other in the front-and-rear direction. The socket terminals 84 are in the form of a pair of elastic metal fittings 85 facing each other in the up-and-down direction. The plug substrate 87 is inserted into the space defined by the pair of elastic metal fittings 85 from one side in the width direction. The plug substrate 87 of the connection substrate part 80 of another first air pressure feeding unit denoted by 4B is inserted into the space from the other side in the width direction.

The plug substrate 87 includes plug terminals 88, which are located on end portions in the width direction of an upper surface and a lower surface of the plug substrate 87 and are equal in number to the socket terminals 84 of the connector main body 81. The plug terminals 88 in a one-to-one correspondence on the respective sides in the width direction are electrically connected to each other. With the plug substrate 87 being inserted in the connector main body 81, each of the plug terminals 88 on one side in the width direction of the plug substrate 87 is electrically connected to the corresponding one of the socket terminal 84 of the connector main body 81. Thus, the socket terminals 84 on the other side in the width direction of the connector main body 81 may be inserted into the connection substrate part 80 of another first air pressure feeding unit denoted by 4B so that two connection substrate parts 80 adjacent to each other in the width direction are electrically connected to each other. In a state in which the first and second air pressure feeding units denoted by 4A, 4B, 5A, and 5B and the end block 2 are linked together in a line in the width direction, the air pressure feeding units 4A, 4B, 5A, and 5B and the end block 2 in the present embodiment are electrically connected to each other.

A second connector 89 and a third connector 90 are disposed on an upper surface of a rear end portion of the plug substrate 87 of the connection substrate part 80. The second connector 89 is a relay point for the supply of power to the pressure sensor assembly 40 and for transmission of sensing signals, and the third connector 90 is a relay point for the supply of power to the switching valve block 30 and for transmission of control signals. In a state in which the connection substrate part 80 is fitted in the substrate accommodation cavity 27, the rear end portion of the plug substrate 87 extends in the connector accommodation recess 28, and the second connector 89 and the third connector 90 are disposed on the plug substrate 87 within the connector accommodation recess 28.

As illustrated in FIGS. 3 and 8, the electric wiring 91 is disposed on the substrate accommodation portion 25 in which the connection substrate part 80 is accommodated.

The electric wiring 91 extends in the front-and-rear direction along the substrate accommodation portion 25. A front end portion of the electric wiring 91 is connected to the first connector 46, and a rear end portion of the electric wiring 91 is connected to the second connector 89. Accordingly, the sensor substrate part 45 of the pressure sensor assembly 40 and the connection substrate part 80 are electrically connected to each other with the electric wiring 91 therebetween. The third connector 90 is connected to a fourth connector 56, which is provided to the switching valve block 30. Thus, electrical signals from the pressure sensor assembly 40 are transmitted to the end block 2 through the connection substrate parts 80 of the air pressure feeding units 4A, 4B, 5A, and 5B liked together in a line in the width direction. This enables transmission of electrical signals between the pressure sensor assembly 40 and the end block 2.

The substrate accommodation portion 25 is fitted with a manifold cover 92, which is disposed over the substrate accommodation portion 25 to cover the pressure sensor assembly 40, the electric wiring 91, the first connector 46, and the second connector 89. The manifold cover 92 in the present embodiment is L-shaped when viewed laterally. The manifold cover 92 includes a front cover portion 93 and a rear cover portion 94. The front cover portion 93 is in a front part of the manifold cover 92 and is in the form of a box. The rear cover portion 94 is in the form of a plate extending rearward from a bottom part of a rear end of the front cover portion 93. A front end and a lower end of the front cover portion 93 are open. The front cover portion 93 has, in a lower part thereof, ridges (not illustrated). The ridges are provided on both sides in the width direction and can be engaged with the guide rails 26. The rear cover portion 94 includes, in a rear part thereof, a hole portion 94a, which is a through-hole extending in the up-and-down direction. The third connector 90 is inserted into the hole portion 94a.

When the manifold cover 92 is moved forward in a state in which the ridges of the front cover portion 93 are engaged with the guide rails 26, a front end part of the front cover portion 93 of the manifold cover 92 comes into contact with a rear end portion of the base body 11 such that the pressure sensor assembly 40, the electric wiring 91, the first connector 46, and the second connector 89 are covered with the manifold cover 92. The manifold cover 92 is then fastened to the rear end portion of the base body 11 by a fastening means, such as screwing. Accordingly, the manifold cover 92 is fixed to the base body 11.

The following describes the second air pressure feeding units 5A and 5B. The second air pressure feeding units 5A and 5B are described below with a focus only on differences between the first air pressure feeding unit 4A described above and the second air pressure feeding units 5A and 5B. The same reference signs are hereinafter used to refer to commonalities that the second air pressure feeding units 5A and 5B have with the first air pressure feeding unit 4A, and redundant description thereof will be omitted.

Figure 9:
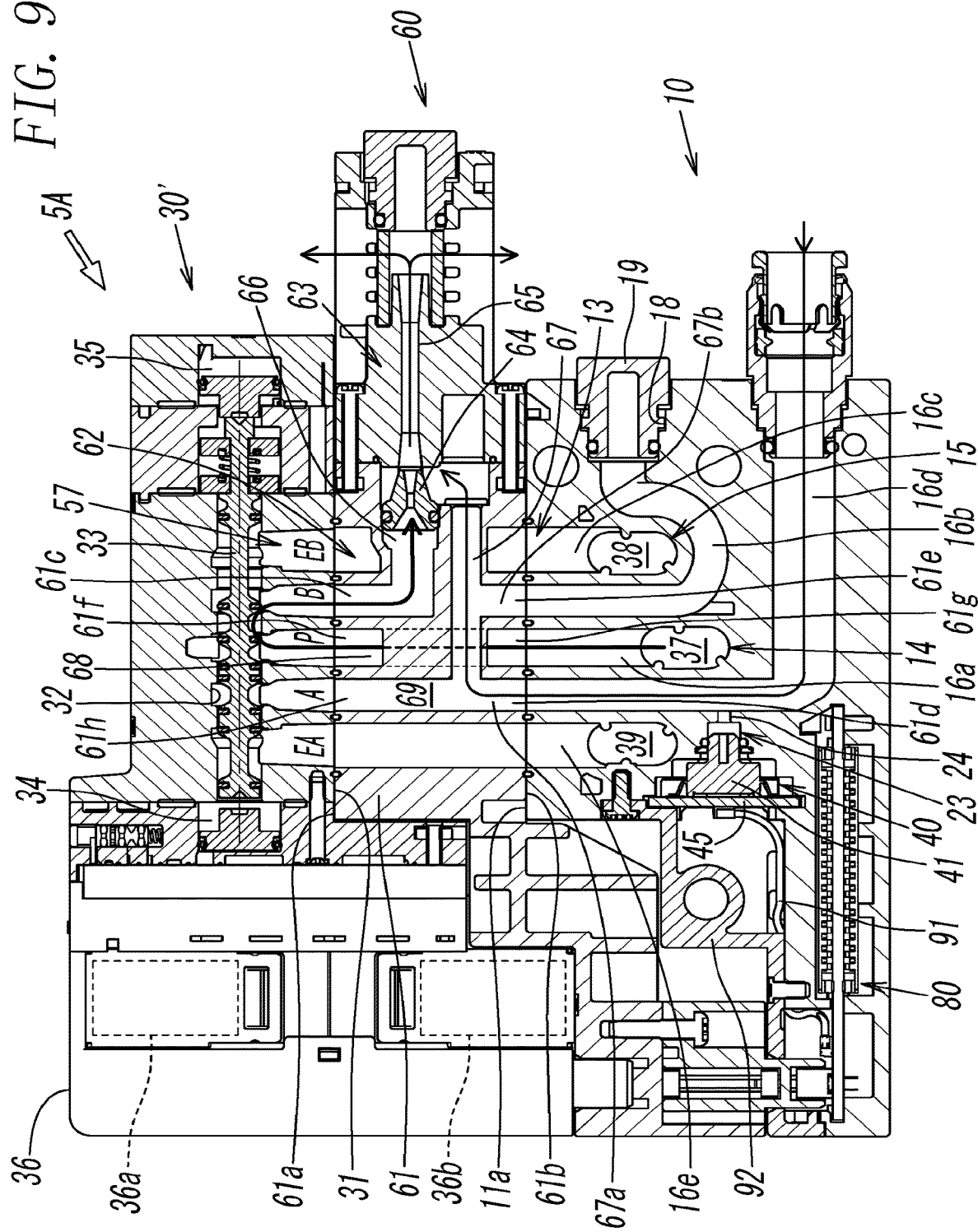
FIG. 9 illustrates a second air pressure feeding unit viewed in section in the direction of arrows IX-IX in FIG. 1 and including a manifold block, an ejector block, and a switching valve block.

As illustrated in FIG. 9, the second air pressure feeding unit 5A includes the ejector block 60 disposed between the mounting surface 11a of the manifold block 10 and the installation surface 31 of the switching valve block 30'. The switching valve block 30' in the present embodiment includes an external pilot operated five-port electromagnetic valve that enables switching between communication states of the port P, the port B, and the port A. The switching valve block 30' includes an external pilot port (not illustrated) that communicates with the pilot flow path 20 (see FIG. 3) of the second air pressure feeding unit 5A to feed pilot pressure. The pilot pressure is then fed into the first pressure chamber 34 and the second pressure chamber 35 through the first pilot valve 36a and the second pilot valve 36b of the pilot valve portion 36. The switching valve block 30' in the present embodiment feeds negative pressure into the first feed flow path 16d (flow path) of the manifold block 10 when the movement of the spool 33 causes a transition to a state in which the port P and the port B communicate with each other. The switching valve block 30' feeds positive pressure into the first feed flow path 16d of the manifold block 10 when the movement of the spool 33 causes a transition into a state in which the port P and the port A communicate with each other.

The ejector block 60 includes an ejector body 61, which is the body of the ejector block 60. The ejector body 61 includes a connection flow path group 62 formed therein to connect each of the ports in the first port group 13 of the manifold block 10 to the corresponding one of the ports in the second port group 57 of the switching valve block 30. The connection flow path group 62 will be described later. The ejector body 61 has, in its upper surface, a first installation surface 61a for connection to the installation surface 31 of the switching valve block 30 and has, in its lower surface, a second installation surface 61b for connection to the mounting surface 11a of the manifold block 10.

A negative pressure generation mechanism 63 is disposed in the ejector body 61. The negative pressure generation mechanism 63 includes a nozzle part 64 and a diffuser part 65. The ejector body 61 includes a feed flow path 66 and a negative pressure communication flow path 67. Compressed air is fed into the nozzle part 64 through the feed flow path 66. Air suctioned due to the ejection of the compressed air from the nozzle part 64 flows through the negative pressure communication flow path 67. The negative pressure communication flow path 67 in the present embodiment includes two flow paths branching therefrom, namely, a first negative pressure communication branch flow path 67a and a second negative pressure communication branch flow path 67b. The ejector body 61 further includes an intake air communication flow path 68 and a first feed communication flow path 69. The intake air communication flow path 68 communicates with the intake air branch flow path 16a of the manifold block 10. The first feed communication flow path 69 communicates with the first feed flow path 16d of the manifold block 10. These flow paths are collectively referred to as the connection flow path group 62.

The first negative pressure communication branch flow path 67a and the second negative pressure communication branch flow path 67b of the negative pressure communication flow path 67 communicate with a first negative pressure feed port 61d and a second negative pressure feed port 61e, which define openings in the second installation surface 61b. One end of the first feed communication flow path 69 communicates with a positive pressure inlet port 61h, which defines an opening in the first installation surface 61a. The other end of the first feed communication flow path 69 communicates with the first negative pressure communication branch flow path 67a. One end of the intake air communication flow path 68 communicates with an intake air outlet port 61f, which defines an opening in the first installation surface 61a. The other end of the intake air communication flow path 68 communicates with an intake air inlet port 61g, which defines an opening in the second installation surface 61b. The ports 61d, 61g, and 61e are connected to the ports 13d, 13a, and 13b (see FIG. 3), respectively, of the manifold block 10. The ports 61h, 61f, and 61c are connected to the ports A, P, and B, respectively, of the switching valve block 30.

Figure 10:
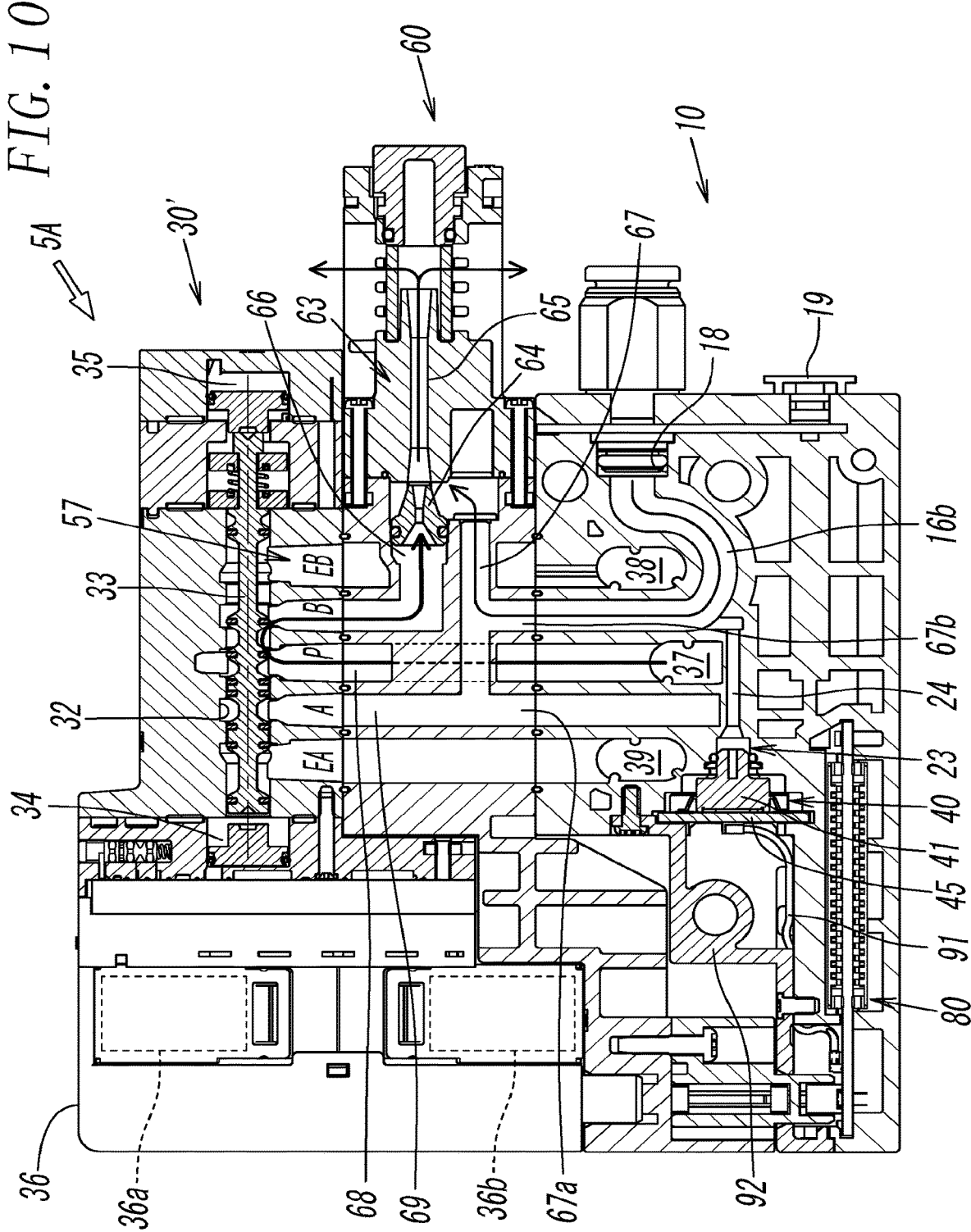
FIG. 10 is a sectional view of a modification of the air pressure feeding unit illustrated in FIG. 9.

In the present embodiment, the sensing flow path 24, which communicates with the sensor installation cavity 23 of the manifold block 10, communicates with the first feed flow path 16d extending perpendicularly to the mounting surface 11a. Alternatively, the sensing flow path 24 may communicate with the second feed flow path 16b as illustrated in FIG. 10. In this case, the opening portion of the second feed flow path 16b is left open such that negative pressure can be fed into an external device through the second feed flow path 16b. The opening portion of the first feed flow path 16d is fitted with the cap 19 such that the first feed flow path 16d is closed. With the sensor installation cavity 23 communicating with the first feed flow path 16d, it is possible to determine by measurement whether the air pressure of compressed air flowing through the first feed flow path 16d is in a negative pressure state or in a positive pressure state.

As described above, each of the manifold blocks 10 of the manifold air pressure feeder 1 according to the present embodiment has, in the end surface 11d on the rear thereof, the sensor installation cavity 23 for communication with the second feed flow path 16b (specific flow path) and for insertion and fixation of the pressure sensor assembly 40. The substrate accommodation portion 25 protrudes from the end surface 11d below the sensor installation cavity 23. The connection substrate part 80 is disposed in the substrate accommodation portion 25. The electric wiring 91 is disposed over the substrate accommodation portion 25 to form an electrical connection between the connection substrate part 80 and the sensor substrate part 45. Thus, the manifold air pressure feeder 1 and the manifold block 10 for use in the manifold air pressure feeder 1 can yield reductions in the piping installation work and other workloads associated with the pressure sensor assembly 40 and can save installation space.

An embodiment has been described above in which the switching valve block 30 is or the ejector block 60 and the switching valve block 30 are mounted on the mounting surface 11a of the manifold block 10. Alternatively, more than one switching valve block 30 or more than one unit including the ejector block 60 and the switching valve block 30 may be mounted on the mounting surface 11a of the manifold block 10.

REFERENCE SIGNS LIST 1 manifold air pressure feeder
4A, 4B first air pressure feeding unit
5A, 5B second air pressure feeding unit
10 manifold block
11a mounting surface
11d end surface
13 first port group
13a intake air port (port)
13b second output port (port)
13c second discharge port (port)
13d first output port (port)
13e first discharge port (port)
14 intake air flow path
15 discharge air flow path
16 first flow path group
16a intake air branch flow path (flow path)
16b second feed flow path (flow path, specific flow path)
16c second discharge air branch flow path (flow path)
16d first feed flow path (flow path)
16e first discharge air branch flow path (flow path)
20 pilot flow path
23 sensor installation cavity
25 substrate accommodation portion
30, 30' switching valve block
31 installation surface
33 spool (switching valve)
37 intake air main flow path
40 pressure sensor assembly
41 sensor part
42 air pressure sensing module (sensing element)
45 sensor substrate part
45a back surface
45b long side
45c short side
45d front surface
50 slippage prevention member
52 upper lug portion (lug portion)
53 lower lug portion (lug portion)
57 second port group
60 ejector block (intermediate block)
62 connection flow path group
80 connection substrate part
91 electric wiring
92 manifold cover
B second output port (port)
EB second discharge port (port)
J central axis
P switching-valve-side intake air inlet port (port)

The invention claimed is:
1. A manifold air pressure feeder, comprising:
a manifold block including a first port group and a first flow path group, the first port group being located in a mounting surface in an upper surface of the manifold block and composed of a plurality of ports through which air is taken in and discharged, the first flow path group being located in the manifold block and composed of a plurality of flow paths, each of the plurality of flow paths communicating with a corresponding one of the plurality of ports in the first port group; and
a switching valve block including a second port group and a switching valve, the second port group being located in an installation surface in a lower surface of the switching valve block and composed of a plurality of ports through which air is taken in and discharged, the switching valve being located in the switching valve block and being for use in performing switching between communication states of the plurality of ports in the second port group, the manifold block and the switching valve block being fixedly linked to each other either by contact between the mounting surface of the manifold block and the installation surface of the switching valve block or by an intermediate block between the mounting surface and the installation surface, the contact forming a direct connection between each of the plurality of ports in the first port group and a corresponding one of the plurality of ports in the second port group, the intermediate block including a connection flow path group forming a connection between each of the plurality of ports in the first port group and the corresponding one of the plurality of ports in the second port group, wherein
the manifold block includes a pressure sensor assembly therein to measure air pressure in a specific flow path in the first flow path group,
the pressure sensor assembly includes a sensor part including a sensing element for sensing air pressure, the first flow path group includes an intake air flow path for feeding air into the switching valve block and a discharge air flow path for discharging air discharged from the switching valve block, the intake air flow path includes an intake air main flow path that mutually connects a pair of opening portions formed on side surfaces opposite to each other in a width direction of the manifold block, the discharge air flow path includes a discharge air main flow path that mutually connects a pair of opening portions formed on side surfaces opposite to each other in the width direction of the manifold block, and a sensor installation cavity is opened below the discharge air main flow path, which is connected to the specific flow path and in which the sensor part of the pressure sensor assembly is hermetically inserted and fixed.

2. The manifold air pressure feeder according to claim 1, wherein the manifold block has, on a rear side in a front-and-rear direction perpendicular to an up-and-down direction, an end surface extending perpendicularly to the mounting surface, and the sensor installation cavity is provided in the end surface.

3. The manifold air pressure feeder according to claim 2, wherein each of the plurality of flow paths in the first flow path group extends in a vertical direction perpendicular to the mounting surface from the corresponding one of the plurality of ports in the first port group, and the sensor installation cavity extends perpendicularly to the plurality of flow paths extending in the vertical direction.

4. The manifold air pressure feeder according to claim 1, wherein the pressure sensor assembly includes a sensor substrate part integrally joined to an end portion of the sensor part on a rear side in a front-and-rear direction of the manifold block and electrically connected to the sensor part, and the manifold block is provided with a slippage prevention member that is in contact with a back surface of the sensor substrate part to keep the sensor part from slipping out of the sensor installation cavity.

5. The manifold air pressure feeder according to claim 4, wherein the pressure sensor assembly is pivotable on a central axis of the sensor part relative to the sensor installation cavity, the sensor substrate part has a quadrangular shape that has long sides and short sides, the slippage prevention member includes a pair of lug portions that are in contact with end portions being part of the back surface of the sensor substrate part and being opposite to each other in a longitudinal direction of the sensor substrate part, and a distance between tips of the pair of lug portions is longer than each of the short sides of the sensor substrate part and is shorter than each of the long sides of the sensor substrate part.

6. The manifold air pressure feeder according to claim 1, wherein the manifold air pressure feeder has a unit group formed by connecting a plurality of air pressure feeding units selected from first air pressure feeding units and second air pressure feeding units in a row in the width direction, each of the plurality of air pressure feeding units includes the manifold block and the switching valve block, in the first air pressure feeding unit, the mounting surface of the manifold block of the first air pressure feeding unit and the installation surface of the switching valve block of the first air pressure feeding unit are in contact with each other, and each of the plurality of ports in the first port group and one port corresponding to each of plurality of ports in the first port group among the plurality of ports of the second port group are directly connected, the second air pressure feeding unit includes the intermediate block located between the mounting surface of the manifold block of the second air pressure feeding unit and the installation surface of the switching valve block of the second air pressure feeding unit, the intermediate block includes a connection flow path group that forms a connection between each of the plurality of ports in the first port group and one port corresponding to each of the plurality of ports in the first port group among the plurality of ports in the second port group, the unit group being provided with a controller linked to an end in the width direction of the unit group, the controller being configured to transmit an electrical signal to the unit group and to receive an electrical signal from the unit group, the manifold block included in each of the plurality of air pressure feeding units forming the unit group includes a connection substrate part for transmission of an electrical signal, and the manifold block includes electric wiring forming an electrical connection between the pressure sensor assembly and the connection substrate part, in the manifold block included in each of the plurality of air pressure feeding units, the first port group includes an intake air port for feeding air into the switching valve block and a discharge port for letting out air discharged from the switching valve block, the intake air flow path includes the intake air main flow path and an intake air branch flow path branching from the intake air main flow path and having an end connected to the intake air port, the discharge air flow path includes the discharge air main flow path and a discharge air branch flow path branching from the discharge air main flow path and having an end connected to the discharge port, in the unit group, the plurality of air pressure feeding units is connected to each other in the width direction, each of the intake air main flow paths of the plurality of manifold blocks is communicated with each other, each of the discharge air main flow paths of the plurality of manifold blocks is communicated with each other, and the controller and the connection substrate parts of the plurality of air pressure feeding units are electrically connected to each other, and the manifold air pressure feeder is thus capable of transmitting electrical signals of the plurality of air pressure feeding units between the controller and the pressure sensor assembly.

7. The manifold air pressure feeder according to claim 6, wherein the manifold block has, on a rear side thereof, an end surface extending perpendicularly to the mounting surface, the manifold block includes a substrate accommodation portion protruding from a lower end surface being part of the end surface and located below the sensor installation cavity, the connection substrate part is disposed in the substrate accommodation portion, the pressure sensor assembly includes a sensor substrate part integrally joined to an end portion of the sensor part on a rear side in a front-and-rear direction of the manifold block and electrically connected to the sensor part, and the electric wiring extends over and along the substrate accommodation portion and has ends that are connected to the sensor substrate part and the connection substrate part, respectively.

8. The manifold air pressure feeder according to claim 7, wherein the substrate accommodation portion is fitted with a manifold cover that is disposed over the substrate accommodation portion to cover the sensor substrate part and the electric wiring.

9. The manifold block for use in the manifold air pressure feeder according to claim 1.

\* \* \* \* \*